H. L. TANNER.
CORRECTION DEVICE FOR GYROCOMPASSES.
APPLICATION FILED DEC. 15, 1919.
1,412,760.
Patented Apr. 11, 1922.
3 SHEETS—SHEET 1.
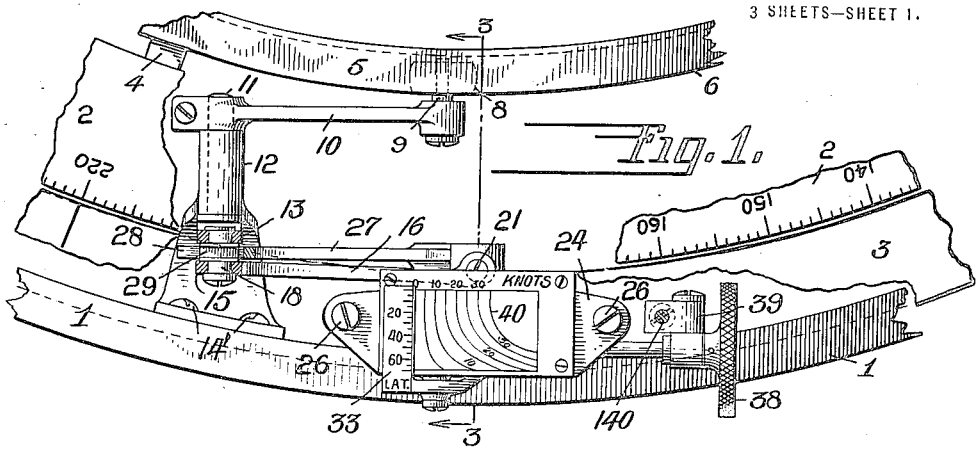
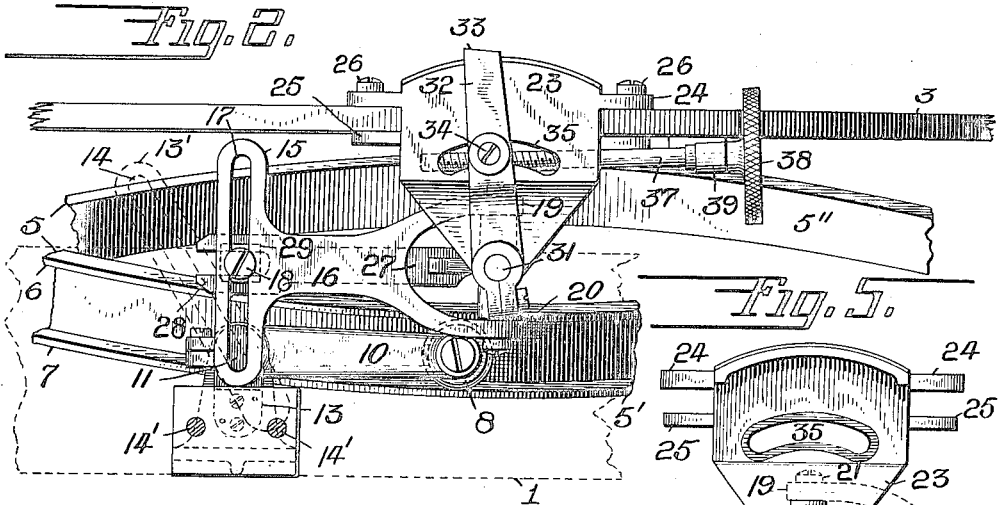
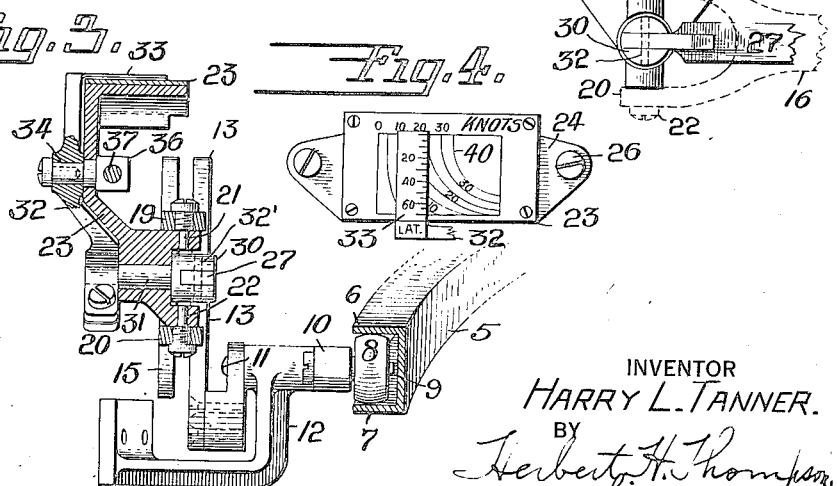
INVENTOR
HARRY L. TANNER.
BY
Herbert H. Thompson
his ATTORNEY

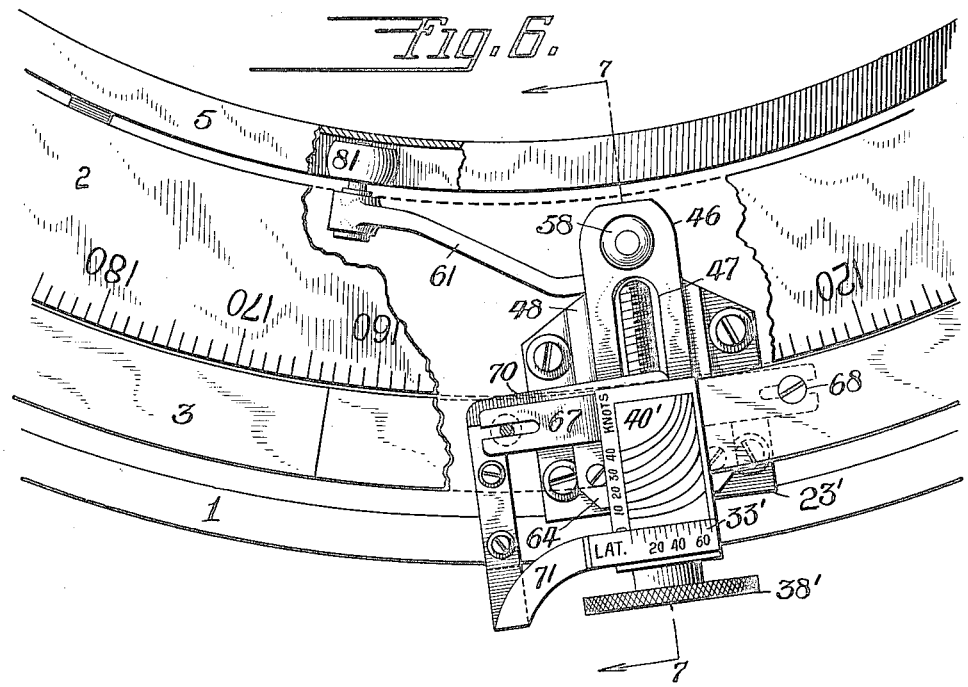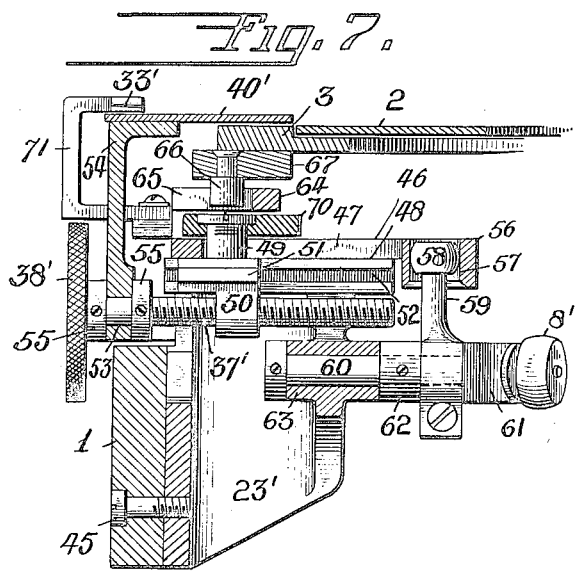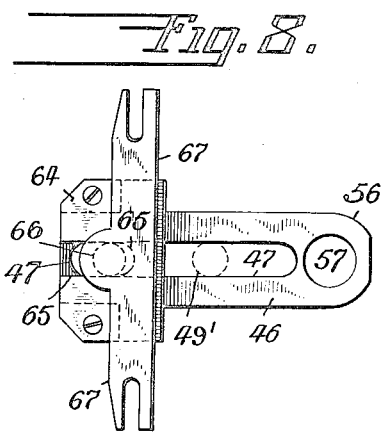

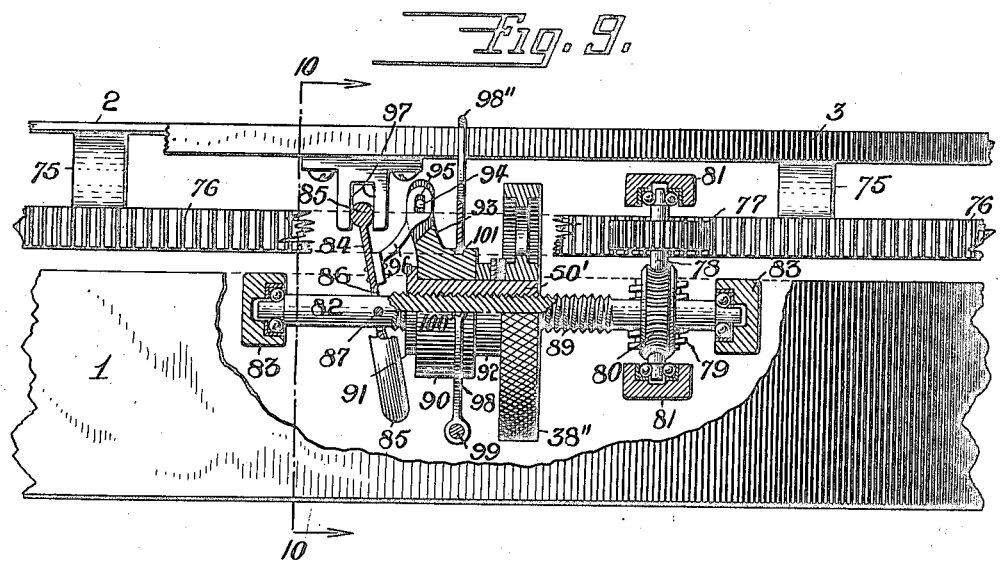

UNITED STATES PATENT OFFICE.

HARRY L. TANNER, OF BROOKLYN, NEW YORK, ASSIGNOR TO THE SPERRY GYROSCOPE COMPANY, OF BROOKLYN, NEW YORK, A CORPORATION OF NEW YORK.

CORRECTION DEVICE FOR GYROCOMPASSES.

1,412,760.                Specification of Letters Patent.    Patented Apr. 11, 1922.

Application filed December 15, 1919. Serial No. 344,809.

*To all whom it may concern:*

Be it known that I, HARRY L. TANNER, a citizen of the United States of America, residing at 1144 East 19th Street, Brooklyn, New York, in the county of Kings and State of New York, have invented certain new and useful Improvements in Correction Devices for Gyrocompasses, of which the following is a specification.

This invention relates to gyroscopic compasses, and more specifically to means for correcting the readings of such compasses. The principles upon which these corrections are based are set forth in U. S. Letters Patent to Elmer A. Sperry, No. 1,255,480, issued February 15, 1918. It is well known that a gyroscopic compass receives its directive properties by reason of the constantly changing position of the rotor casing in space due to its pendulous factor and the rotation of the earth. In other words, the gyroscope is pendulously supported so that it hangs vertically with respect to the earth. As the earth rotates upon its axis carrying the gyroscope with it, the pendulous gyro must shift its position with respect to space to remain vertical with respect to the earth. This shifting or tilting of the gyro with respect to space causes it to precess to align its plane of rotation with the plane through which the force acts to tilt the gyro. This plane, when the compass is on the earth's equator lies through the equator or at right angles to the earth's axis so that the axis of the gyro parallels the axis of the earth and points true north and south. If now, a ship carrying the compass were traveling due north from the equator at a speed of, for instance, 20 knots, we would have the compass moving around the center of the earth in one direction at a speed of approximately 1,000 miles an hour, and in another direction at a speed of 20 knots, so that forces of different values will be acting to tilt the gyro in different directions. Obviously the resultant of these component forces is in a plane somewhere between the strong easterly component and the weak northerly component and in fact is much nearer the easterly component. In other words, the resultant of the movements of the compass in the two directions is to carry it around the axis of the earth through a course slightly north of east, so that the axis of the gyro pointing at right angles to this course will point slightly north-west and south-east. As the compass card is thus thrown slightly west a corresponding movement of the lubber ring will effect a correct relative reading of the card and ring. Again, if the ship were traveling north-east from the equator at a speed of 20 knots, it would be moving away from the equator at a rate of somewhat less than 20 knots, so that the northerly course component would be less and the resultant of the forces acting to tilt the gyroscope would lie still closer to the equator. It appears then that the heading as well as the speed of the ship enters into the computation of the forces acting upon the pendulous gyro.

Thus far we have considered the ship as being on the equator and traveling at a given speed in a given direction. Suppose now that the ship is on latitude 45° N. and traveling at the previously assumed speed and in either of the previously assumed directions, obviously the force caused by the rotation of the earth will be less than at the equator, due to the fact that the ship will be traveling around the earth's axis at a much lower speed. The ratios which the heading and speed of the ship bear to the rotation of the earth, in computing the resultant of the forces acting upon the gyro then are dependent upon the latitude in which the ship lies at the time of computing, and the corrections applied to the lubber ring must also involve the latitude of the ship as a factor.

The total of the corrections applied to the lubber ring due to these several factors may be expressed by the following formula $$D = \frac{KS \cos H}{\cos L}$$

where
- $D$ = the total correction angle in degrees,
- $K$ = a constant,
- $S$ = speed of the ship in knots,
- $H$ = angle in degrees of ship's heading or course from true geographic north,
- $L$ = latitude.

In the aforementioned patent, the heading correction is automatically effected and applied to the lubber ring, while the speed and latitude corrections are each applied by separately actuated manual means.

The objects of the present invention are to improve upon the former correction device by providing a device wherein there is less lost motion; wherein less energy is required for its operation and by which the speed and latitude corrections may be applied by one setting.

Referring to the drawings wherein I have shown what I now consider to be the preferred form of my invention:

Fig. 1 is a plan view of the correction device and fragmentary portions of the compass mechanism to which it is attached.

Fig. 2 is a corresponding elevation.

Fig. 3 is a sectional detail taken on line 3—3 of Fig. 1.

Fig. 4 is a view of the latitude and speed correction index.

Fig. 5 is a detail of parts of the device.

Fig. 6 is a plan view of a modified form of correction device.

Fig. 7 is a section in elevation thereof taken on line 7—7, Fig. 6.

Fig. 8 is a detail of parts of the mechanism shown in Figs. 6 and 7.

Fig. 9 is a fragmentary elevation of another modification.

Fig. 10 is a section thereof taken on line 10—10 in Fig. 9.

Fig. 11 is a plan of the scale used in connection with this modification.

In the drawings 1 represents the spider or frame from which what is known as the sensitive element of the compass is suspended, and relative to which the compass card 2 is rotated by the directive movements of the compass gyroscope or gyroscopes. Surrounding the outer edge of said card is the lubber ring 3. Rigidly suspended from the compass card as by means of members 4 is a cosine ring or cam 5. The said card and cosine ring, as more clearly disclosed in the aforesaid Letters Patent, are caused to follow all movements of the sensitive element. This ring, as shown in Fig. 2, is lower on one side 5′ than on the other 5″, and carries between its flanges 6, 7 a roller 8 on a short shaft 9 in turn secured to one end of arm 10. Arm 10 is secured at its other end to a short shaft 11 mounted in a bracket 12 as a bearing. On the opposite end of shaft 11 is fixed a slotted arm 13. Arms 10 and 13 thus form a bell crank lever having its pivot in bracket 12 which is secured as by means of screws 14′ to spider 1. The arm 13 is provided with a slot 14 as shown in the dotted line position of said arm in Fig. 2. When arm 13 is in its upright position as in Fig. 3 it is directly behind the crosshead 15 of a link 16, the arm being thus hidden behind said crosshead in Fig. 2. Slot 14 in this position registers with a corresponding slot 17 in crosshead 15. A pin 18 is shown passing through slots 14 and 17, so that lateral movement of arm 13, or more correctly, movement of arm 13 about its axis 11 into dotted line position 13′, will obviously effect a lateral movement in the same direction of link 16.

Link 16 may at the end opposite the crosshead end, be provided with bifurcations 19, 20 pivoted on a vertical axis by means of pins 21, 22 on a member 23. This member is provided adjacent its upper end with projections 24, 25 between which the lubber ring 3 is adapted to fit, said member being secured to the lubber ring by screws 26.

From the descriptiton thus far it will be obvious that as a ship changes its heading and the spider 1 and lubber ring 3 turn with it, the cosine ring and compass card will remain fixed in space excepting for the slight error caused by heading. The resultant relative rotation of the lubber ring and cosine ring causes roller 8 to be carried around to another position in the cosine ring, which being inclined, will lower or raise said roller to turn the bell crank lever 10—13 upon its axis 11; the arm 13 moving to the right or to the left toward the dotted line position 13′. By reason of its connection with link 16 through pin 18 it will move said link to the right or left, and with this link, member 23 and lubber ring 3. Thus the lubber ring is automatically shifted with respect to the compass card in response to changes in heading of the ship; the degree of shifting bearing a direct relation to the change in heading. Link 16 and arm 27 are adapted to turn on their vertical axes 21—22 and 32 to provide the necessary flexibility in operation.

The latitude and speed corrections are added by shifting the point of connection between arms 13 and 15. For this purpose I have shown an arm 27 having bifurcations 28 at one end within which is carried a longitudinally slidable member 29 through which pin 18 passes. The other end of arm 27 is positioned in a lateral slot in the enlarged rear end 30 of a short shaft 31 and secured therein by a pin 32′. On the front end of shaft 31 is rigidly clamped an arm 32 which reaches upwardly and may be provided with a top portion 33 extending over the top of member 23. A pin 34 passing through arm 32 and a curved slot 35 in member 23 is provided with an enlarged end 36 having threaded engagement with a screw member 37. The said screw may be provided with a knurled head 38, and is rotatably but non-slidably carried by a bracket 39 fixed as by means of a screw 140 to lubber ring 3. The top piece 33 of arm 32 is provided with markings as shown, representing various latitudes, while the top of member 23 is provided with a plurality of speed curves 40.

Rotation of screw head 38 will rotate arms 32 and 27 on their axis 31 and slide pin 18 up or down in slots 14, 17. It will be evident that if arm 13 were in the dotted line position 13′ and pin 18 were moved up or down, link 16 would be moved to the left or right, carrying with it member 23 and lubber ring 3. Presuming the ship to be on latitude 40 and traveling at a speed of 20 knots, knurled head 38 will be turned until the graduation representing latitude 40 on member 33 intersects the speed curve representing 20 knots as shown in Fig. 4. The speed and latitude corrections are thus made by the one setting through the knurled screw head 38.

From a closer examination of the invention now it will be noted that, if a ship having the compass mounted thereon is on the earth's equator and not under headway, the setting screw 38 will be actuated to position the latitude and speed corrections at zero latitude and zero speed as in Fig. 1. This will place the pin 18 at the lower end of slots 14 and 17 and in alignment with the axis 11 of bell crank lever 10—13. If then, the ship should swing around so that the cosine ring 5 actuates said bell crank lever, no motion will be imparted to link 16 and, therefore, no correction setting of the lubber ring effected. And this is so because the heading of the ship introduces no error into the readings of the compass unless it is coupled with either speed or speed and latitudinal displacement of the ship from the equator. Again, if the ship is displaced from the equator and is under headway, the correction being effected through setting screw 38 in accordance with the latitude and speed scales, pin 18 will be correspondingly positioned in slots 14, 17 (the proper distance above axis 11) so that the cosine ring in response to the heading of the ship, will shift the lubber ring. By reason of the structure of the correction device the correction applied to the lubber ring is in accordance with the formula hereinbefore set forth.

In the modification shown in Figs. 6, 7, and 8 the member 23' is shown secured by screws 45 to the inner circumference of spider 1. A lever 46 having a longitudinal slot 47 is carried on the surface 48 of member 23' and having its fulcrum pin 49 passing through said slot and secured in a carriage 50. The said carriage is in turn provided with guide projections 51 working in guideways 52 in member 23'. A screw 37' having a knurled head 38' passes through a hole 53 in a bracket 54 which is integral with member 23'. Said screw is adapted to rotate in said bracket, but is prevented against longitudinal movement therein by collars 55 secured thereto on opposite sides of said bracket. Screw 37' passes through carriage 50 in threaded engagement therewith, so that rotation of the screw will cause the carriage to move laterally through guideways 52 to vary the position of fulcrum pin 49.

The outer end 56 of lever 46 may be provided with a bore 57 into which fits a spherically shaped knob 58 carried on the end of an arm 59. This arm is fixed on a shaft 60 upon which is also fixed a second arm 61 at 62. Said shaft is rotatably mounted in bearing 63 integral with member 23'. Arms 61—59 thus form a bell crank lever corresponding to the bell crank lever 10—13 shown in the other form of the invention. Arm 61 carries a roller 8' operating in the cosine ring 5 as in the other form, so that relative turning of said ring and spider 1 will cause bell crank lever 61—59 to rotate on its axis 60. This in turn will obviously effect the rotation of lever 46 about its axis 49. The purpose of the spherically shaped knob 58 working in bore 57 is to obtain the advantage of a ball and socket joint and at the same time permit the ball to move up and down in the socket.

Lever 46 is provided with an upper portion 64 having a slot 65 into which projects a pin 66 fixed to a bar 67 which is in turn secured to the lubber ring 3 by means of screws 68.

In Fig. 7 pin 49 is shown in axial alignment with pin 66 so that lever 46 may turn about its axis without affecting the position of pin 66, but when pin 49 is moved to some other position in slot 47 as indicated by dotted lines 49' (Fig. 8), it will be seen that turning of lever 46 about said pin will effect a lateral movement of pin 66 and consequently shift the position of the lubber ring 3 as in the other form of the invention. Obviously, since arm 59 moves in a fixed plane, it will effect a slight longitudinal movement of lever 46 on pin 49. Slot 65 will in turn permit a similar movement of upper portion 64 on pin 66.

Fixed on pin 49 is a member 70 carrying an arm 71 provided with a latitude scale 33' adapted to read in conjunction with speed curves 40'.

Rotation of knob 38' will position pin 49 in accordance with the speed and latitudinal position of the ship; the movements and position of said pin being indicated by indicator 33'—40'. The proper correction will then be applied to the lubber ring by the operation of the bell crank lever 61—59.

In Fig. 9 the spider is again shown at 1, the compass card at 2, and the lubber ring at 3. Rigidly secured to the compass card as by means of brackets 75 is the master or phantom gear 76 through which the sensitive element actuates the compass card and cosine ring as is well known. In the present form the cosine ring may be dispensed with, and the gear 76 used to actuate a pinion 77 on a shaft 78 having its bearings in brackets 81 carried by the spider. Said shaft is provided with a worm 79 meshing with a worm wheel 80 fixed on a second shaft 82 having its bearings in brackets 83 also carried by said spider. A disc 84 having a rim 85 substantially circular in cross section and provided with an aperture 86 through its center through which shaft 82 may pass, may be provided with a short axle 87 fixed thereto as at 88, passing across said aperture and transversely through shaft 82, so that said disc may be carried by said shaft 82 and at the same time rotate on axle 87.

Shaft 82 is provided with screw threads 89 in threaded engagement with a carriage 50' upon which is fixed the setting wheel 38''. A collar 90 is rotatably mounted on said carriage between shoulders or flanges 91, 92. A projection 93 on collar 90 is provided with a pin 94 which may engage in a slot 95, an arm 96 fixed to disc 84. Rotation of the setting wheel 38'' thus rotates the disc upon axis 87 and varies its inclination relative to shaft 82.

It will be seen that rotation of the compass card and gear 76 will effect the rotation of shaft 82, which will in turn carry the disc 84 with it. Preferably the ratios of the gears 76—77—79—80 is such that one complete revolution of gear 76 will effect one complete revolution of shaft 82 and disc 84. The rim 85 of said disc is engaged between two projections 97 reaching downwardly from the lubber ring 3, so that as shaft 82 rotates with disc 84 the lubber ring will be moved by reason of the inclination of the disc, and in an amount dependent upon the degree of said inclination.

An arm or lever 98 pivotally carried by shaft 99 fixed to spider 1, and encircling collar 90 as indicated by dotted lines 98' is provided with pins 100 projecting into circumferential groove 101 in said collar, so that rotation of the collar may take place without affecting said lever, but movement of the collar along the shaft 82 by reason of adjustments effected through setting wheel 38'' will cause said lever to rock on its fulcrum 99. The upwardly extending portion 98'' of lever 98 is bent over as shown and forms an index cooperating with a scale 102 carried by the spider. The said scale may comprise two parts A and B divided by the 0° line representing the equator. The other lateral lines 103, 104 having numerals 105, 106 associated therewith represent latitudes in degrees north and south of the equator. The curved lines 107 represent speed in knots. The object of the north and south scales is to provide a scale for compasses which are so designed as to require different settings for north and south latitudes. The proper setting of the correction device when the ship is on latitude 20° N. and moving at 20 knots will be effected by rotation of setting wheel 38'' to position index 98'' at the point of intersection of the line representing 20° N. and the curve representing 20 knots speed.

In accordance with the provisions of the patent statutes, I have herein described the principle operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a correction device for gyro-compass apparatus, the combination with a rotatable element, a cam ring in fixed relation to said element, a reference member adapted for reading with said element, means connected with said cam and said reference member and adapted upon relative rotation of said cam and member about a common axis to shift the position of said member relative to said element, and a common means for controlling the degree of such shifting in accordance with the speed and latitudinal position of a ship carrying said compass.

2. In a correction device for gyro-compass apparatus, the combination with a rotatable element, a cam ring in fixed relation to said element, a reference member adapted for reading with said element, means connected with said cam and said member and adapted upon relative rotation of said cam and member about a common axis to shift the position of said member relative to said element, a common means for controlling the degree of such shifting in accordance with the speed and latitudinal position of a ship carrying such apparatus, and latitude and speed indicating means associated with said common means.

3. In navigational apparatus, a compass card, a cam ring tilted at an angle to said card and arranged to move therewith in azimuth, indicating means associated with said card, latitude and speed correction means for correcting the apparent reading of said apparatus, common means for setting said correction means, and means actuated by said cam for actuating said correction means.

4. In a navigational apparatus, a compass card, a cam ring tilted at an angle to said card and arranged to move in azimuth therewith, indicating means associated with said card, a lever actuated by said cam and adapted to change the relative position of said card and indicating means, means for shifting the fulcrum of said lever, and a plurality of indicating scales associated with said last mentioned means.

5. In a navigational apparatus for use on ships or other vehicle, having a movable indicator, means associated with said indicator for correcting the indications thereof in accordance with changes both in speed and latitude of such ship or other vehicle and means actuated by a single manual operation for actuating said first mentioned means.

6. Navigation apparatus for a vehicle, including a movable indicator, a movable member provided with a lubber line associated with said indicator, means controlled by movements of said indicator arranged to move said member to correct the apparent indications of said apparatus, and common means adapted to be positioned in accordance with the speed and latitude of such vehicle for further moving said member.

7. In a navigation apparatus for ships, a compass card, a lubber ring adjacent thereto, a correction device carried by a relatively fixed part of said apparatus and having connections with said card and ring, said connections being such that said device is adapted to shift the position of said ring in response to movements of said card, and means for changing the relative positions of parts of said device in accordance with the speed and latitude of such ship to vary the amplitude of such shifting.

8. In navigational apparatus for ships, a pair of cooperating indicating members, a linkage device carried by a fixed part of said apparatus and connected with each of said members, said device being adapted upon movement of one of said members to shift the position of the other thereof, and means adapted to be positioned in accordance with speed and latitudinal position of the ship for changing the inter-relationship of parts of said device for modifying the effect thereof upon said other of said members.

9. In navigational apparatus for ships, a frame, a pair of rotatably supported cooperating indicating members, a correction device carried by said frame and connected with each of said members, said device being adapted upon rotation of one of said members to effect rotation of the other thereof, and common means adapted to be positioned in accordance with the speed and latitudinal position of the ship to shift the relationship of parts of said device to vary the effect thereof upon said other member.

10. In navigational apparatus for ships, a pair of cooperating indicating members, a lever carried by a stationary part of said apparatus and actuated by movement of one of said members, a lever carried by the other of said members, a pivotal connection between said levers whereby movement of said one of said members will effect a movement of the other thereof, and means for shifting said connection to vary the degree of movement of said other member.

11. In navigational apparatus for ships, a pair of cooperating indicating members, a separate lever associated with each of said members, means interconnecting said levers for causing movement of one of said members to effect a movement in the other thereof, and means for changing the position of said interconnecting means.

12. In navigational apparatus for ships, a pair of cooperating indicating members, mechanism responsive to relative movements of said members for changing the position of one of said members, means for altering the relationship of parts of said mechanism to vary the degree of said changing and cooperating latitude and speed indicators associated with said means, at least one of said indicators comprising a reference curve.

13. In navigational apparatus for ships, a frame, a pair of rotatably supported cooperating indicating members, a correction device carried by said frame including a lever, means associated with one of said members for actuating said lever, means connecting said lever with said other member, and means for adjusting the fulcrum of said lever for varying the effect thereof upon said other member.

14. In navigational apparatus for ships, a frame, a pair of rotatably supported cooperating indicating members, a correction device carried by said frame including a lever, provided with a bore at one end thereof, a second lever actuated by movements of one of said members and having a spherically shaped knob positioned in said bore to actuate said first mentioned lever, means connecting said first lever with the other of said members, and means for adjusting the fulcrum of said first lever to vary the effect thereof upon said other of said members.

15. In navigational apparatus, a compass card, a circumferential member fixed to said card whereby said card and member move together in azimuth, indicating means associated with said card, latitude and speed correction means for correcting the reading of said apparatus, common means for setting said correction means, and means actuated by said member for actuating said correction means.

16. In a gyroscopic compass, two cooperating indicating members, a device carried by a fixed part of the compass and connected to each of said members, said device being adapted upon relative movement of said members to modify the indications thereof, and a single setting means adapted to be adjusted in accordance with a plurality of known influences upon the compass for varying the degree of such modification effected by said device.

17. In a navigational apparatus for ships, a pair of cooperating indicating members, means controlled by the heading of the ship for modifying the indications of said members, and a common setting means adapted to be adjusted in accordance with the speed and latitudinal position of the ship for further modifying such indications.

18. In a compass for vehicles, a gyroscopically controlled indicating member, a cooperating indicating member, a device for correcting the indications of said members, means positioned in accordance with the heading of the vehicle for actuating said device, and a common setting means adapted to be positioned in accordance with the speed and latitudinal position of the vehicle for actuating said device and for controlling the degree through which said first mentioned means actuates the device.

19. In a navigational apparatus, an indicating member, a cooperating indicating member, means controlled by the heading of a ship carrying the apparatus for correcting the indications of said members, and a common setting means adapted to be positioned in accordance with the speed and latitudinal position of the ship for controlling the degree of correction effected by said first mentioned means.

In testimony whereof I have affixed my signature.

HARRY L. TANNER.